US012669942B2

(12) United States Patent　　(10) Patent No.: US 12,669,942 B2
Costa et al.　　(45) Date of Patent: Jun. 30, 2026

(54) METHODS TO RE-USE STUCK CELLS IN DATA STORAGE, AND ASSOCIATED MEMORY SYSTEMS

(71) Applicant: NXP B.V., Eindhoven (NL)

(72) Inventors: Raffaele Costa, Eindhoven (NL); Andrea Castelnuovo, Hamburg (DE); Matthieu Deloge, Waalre (NL); Maurits Mario Nicolaas Storms, Best (NL); Sergio Masferrer Oncala, Eindhoven (NL)

(73) Assignee: NXP B.V., Eindhoven (NL)

( * ) Notice: Subject to any disclaimer, the term of this patent is extended or adjusted under 35 U.S.C. 154(b) by 217 days.

(21) Appl. No.: 18/430,714

(22) Filed: Feb. 2, 2024

(65) Prior Publication Data

US 2024/0311016 A1　Sep. 19, 2024

(30) Foreign Application Priority Data

Mar. 15, 2023　(EP) ..................................... 23162054

(51) Int. Cl.
　*G06F 3/06*　　(2006.01)
(52) U.S. Cl.
　CPC .......... *G06F 3/0616* (2013.01); *G06F 3/0644* (2013.01); *G06F 3/0673* (2013.01)
(58) Field of Classification Search
　CPC .... G06F 3/0616; G06F 3/0644; G06F 3/0673; G06F 12/0238; G06F 2212/1036; G06F 2212/1044; G06F 2212/7201; G06F 2212/7202; G06F 2212/7204; G06F 2212/7211; G11C 29/4401; G11C 29/883
See application file for complete search history.

(56) References Cited

U.S. PATENT DOCUMENTS

| | | | |
|---|---|---|---|
| 8,887,025 B2 | 11/2014 | Mateescu et al. | |
| 11,380,415 B2 | 7/2022 | Noguchi et al. | |
| 2011/0252215 A1* | 10/2011 | Franceschini | G11C 13/0004 711/170 |
| 2013/0339574 A1* | 12/2013 | Franceschini | G06F 12/0292 711/E12.008 |
| 2014/0164873 A1 | 6/2014 | Guyot et al. | |
| 2014/0245107 A1* | 8/2014 | Thiruvengadam | G06F 3/064 714/766 |

(Continued)

OTHER PUBLICATIONS

Asadinia, M., "Enhancing lifetime of PCM-based main memory with Efficient Recovery of Stuck-at Faults", 2018 IEEE Computer Society Annual Symposium on VLSI, Jul. 8-11, 2018.

(Continued)

*Primary Examiner* — Larry T Mackall

(57) ABSTRACT

Disclosed is a method of storing data in a stuck-cell memory page of a memory array, the stuck-cell memory page having a cell at a stuck-cell-identifier cell of the memory page stuck at a stuck-cell-value, the method comprising: identifying a match between a first dataset and the stuck-cell memory page; and storing the dataset in the stuck-cell memory page; wherein the identifying a match comprises identifying that the at least one bit of the dataset which corresponds to the stuck-cell-identifier of the memory cell has a value which is equal to the stuck-cell value. A memory system configured for the above method is further disclosed.

18 Claims, 12 Drawing Sheets

(56)     References Cited

U.S. PATENT DOCUMENTS

| 2014/0281827 | A1 |  | 9/2014 | Twitto et al. |
|---|---|---|---|---|
| 2016/0266847 | A1 |  | 9/2016 | Shu et al. |
| 2017/0090762 | A1 |  | 3/2017 | Ea et al. |
| 2017/0285996 | A1 |  | 10/2017 | Ostertun et al. |
| 2018/0068731 | A1 |  | 3/2018 | Kim et al. |
| 2018/0293174 | A1 | * | 10/2018 | Song .................. G06F 12/1009 |

OTHER PUBLICATIONS

Seong, N., "Safer: Stuck-at-Fault Error Recovery for Memories", 2010 43rd Annual IEEE/ACM International Symposium on Microarchitecture, Dec. 4-8, 2010.

* cited by examiner

400

METHODS TO RE-USE STUCK CELLS IN DATA STORAGE, AND ASSOCIATED MEMORY SYSTEMS

CROSS-REFERENCE TO RELATED APPLICATIONS

This application claims the priority under 35 U.S.C. § 119 of European Patent application no. 23162054.3, filed on 15 Mar. 2023, the contents of which are incorporated by reference herein.

FIELD

The present disclosure relates to methods to reuse stuck cells in data storage, and associated memory systems. It particularly relates to memory systems and memory arrays arranged in memory pages, in which stuck cells may be identified within individual memory pages.

BACKGROUND

Many memory systems include a memory block or memory array, also referred to as a memory macro, which comprises many separately identifiable memory pages. Each memory page is associated with a physical address. Each memory page may be further subdivided, for example into a set of words, each of which include a set of cells. Each cell may be single bit (e.g. can have a value of "0" or "1" In the case of a binary bit), or may be multibit (for example, it could contain two binary bits, and thus able to stores the values "00", "01", "10", or "11", again using the example of binary bits.

For reasons which will be discussed in more detail hereinbelow, sometimes a cell can get "stuck" at one value, and is unresponsive to attempts to write a different value to the cell. Such a cell will be referred to herein as a "stuck-cell" (or, without limitation, as "stuck-bit" since in many instance, the cell is single-bit), and the value at which it is stuck will be referred to as "stuck-cell-value". For example, a single-bit cell may get stuck at a value "1". If data having a value "0" in the corresponding position is written onto the page containing the stuck cell, the data will be corrupted (since the value "0" will be incorrectly stored as a "1"); this can be checked by reading the data out of the page, and comparing it with the original data—and difference will by indicative of a write failure.

Memory systems are often configured to use so-called logical addresses. In such memory systems, when the memory system receives a request to write data to (or read data from) an address, this does not refer to the physical page in the memory array. Instead, the memory system contains a mapping between the logical address and physical address. This conceptual separation between the (logical) address of the memory page and the associated hardware (at a fixed physical address) allows the replacement of faulty hardware (such as a stuck-cell memory page), with other hardware (in this case a memory page at a different physical location), without the degradation being apparent to a user.

Conventionally, the page containing the stuck bit is identified as a "bad" page. Memory systems typically maintain a list of such "bad pages", and bad pages are not used in subsequent memory operations. It will be appreciated that there may be faults other than a stuck cell associated with the page resulting in that page being added to the bad page list. For example and without limitation, it may be that the cell cannot be properly read, and thus its value is indeterminate.

Even if the memory block is initially provided with some "spare" pages to accommodate such degradation, over time, the list of bad pages grows, resulting in a reduction in the storage capacity of such memory.

SUMMARY

According to a first aspect of the present disclosure, there is provided a method of storing data in a stuck-cell memory page of a memory array, the stuck-cell memory page having a cell at a stuck-cell-identifier cell of the memory page stuck at a stuck-cell-value, the method comprising: identifying a match between a first dataset and the stuck-cell memory page; and storing the dataset in the stuck-cell memory page; wherein the identifying a match comprises identifying that the at least one bit of the dataset which corresponds to the stuck-cell-identifier of the memory cell has a value which is equal to the stuck-cell value. By matching a dataset to a stuck cell memory page, that dataset may be conveniently stored in the stuck cell memory page without loss of data associated with the stuck cell. Thereby the stuck-cell need not be "taken out of service", or added to a bad page list but may be continued to be used as part of the active memory to store datasets. This may have an effect of avoiding a shrinkage over time of the size of the usable memory in the memory array which may otherwise be the result of discarding pages in which there is a stuck bit. Furthermore, since the dataset to be stored in the stuck-cell memory page is, by definition, "already" matched to the memory page, no manipulation of the dataset (for example inverting the value of one or more bits of the dataset) is required prior to writing the dataset into the memory page or after reading the data from the memory page. The additional processing complexity which would otherwise be associated with such manipulation may therefore be avoided.

In one or more embodiments, the cell is a single-bit cell, and the at least one bit is a single bit having a value of a one of "0" and "1". A one-bit memory cell is generally the simplest type of memory cell, however the present disclosure is not limited thereto, and in one or more other embodiments, the cell is an n-bit cell, and the at least one bit is n bits. In either case the cell is not necessarily constrained to a binary value, and the present disclosure extends to non-binary cells (such as ternary cells which can take values, "−1", "0", and "1" in each cell bit).

In one or more embodiments, the method comprises: identifying the stuck-cell memory page, by writing a to-be-written dataset to the memory page; reading a check dataset from the memory page; and identifying a mismatch between the to-be-written dataset and the read dataset at the stuck-cell-identifier.

In one or more particular embodiments, the method further comprises maintaining a list of stuck-cell memory pages, wherein the list includes a stuck-cell-identifier and a stuck-cell value for each respective stuck-cell memory page. In particular, rather than discarding the memory page by adding it to a "bad page" list on identification of a stuck cell, use of a "stuck page" list (or which may also be referred to as a "stuck-page" list, or "stuck-cell page" list) may enable the use of those pages in appropriate situations, as disclosed herein. In embodiments in which a "bad page" list is separately maintained by the memory controller, the size of the bad page list may be reduced or minimised by the use of a separate stuck page list. In particular, it will be appreciated that, in general, a bad page list may not need to store the characteristics associated with each element. In other words, a bad page list may merely list the bad pages, without any further detail, and—in particular without detailing the stuck-cell-identifier, and the stuck-cell-value.

In such embodiments, the method may further comprise, in response to identifying the stuck-cell memory page, adding the stuck-cell memory page to the stuck page list. In embodiments in which a "bad page" list is separately maintained by the memory controller, the size of the bad page list may be minimised by the use of a separate stuck page list. It will be appreciated that, in general, a bad page list may not need to store the characteristics associated with the elements, that is to say, each page, of the stuck page list—in particular the stuck-cell-identifier, and the stuck-cell-value.

Such methods may further comprise, in response to a request to write the first dataset into the memory array, using the list to identify a match between the first dataset and a stuck-cell memory page in the stuck page list. In particular, in order for the memory controller to select a physical address of a memory page into which to write the first dataset, the controller may first poll the stuck page list, and compare the pages in this list, page by page, with the first dataset in order to determine whether the stuck-cell value (or values) matches to the value of the associated bit bits in the first dataset. If the values match, the dataset may be written to that page without loss of integrity. The memory controller may, separately, maintain a free page list (other than the stuck page list). In the instance that no matches are found between any of the elements of the stuck page list and the corresponding bits of the first dataset, the controller may select a page from the free page list in order to determine the physical address to which to write the dataset write the dataset According to one or more other particular embodiments, the step of identifying a match comprises identifying a match from a plurality of stored datasets stored in the memory array. Such embodiments may not require to maintain a list of stuck cell pages, since according to one or more such embodiments, it may be appropriate to immediately make use of the stuck cell page by writing an appropriate dataset to it.

In such embodiments, the plurality of stored datasets may consist of program code. Program code may be considered to be static or as quasistatic and thus may not undergo frequent read/write operations, compared with or relative to media, files, or the like data which may be read or written more frequently or dynamically. This may be convenient, since the processing overhead associated with identifying an appropriate dataset which matches the stuck cell memory page may thereby be reduced or minimised.

Such methods may further comprise moving other datasets between pages of the memory array to tend to equalise a number of write operations to each memory page in the memory array. Shuffling, swapping, or in general moving datasets between different pages of the memory array may be beneficial in order to equalise the number of read/write operations associated with any individual page according to a process known as wear levelling. Using methods according to embodiments of the present disclosure in association with such wear levelling may be beneficial.

In one or more embodiments, the dataset is unaltered. In particular, according to embodiments of the present disclosure there may be no requirement to invert individual bits of datasets, or even complete datasets in order to accommodate their use in stuck cell pages. This may avoid processing overhead.

In one or more embodiments, each page of the memory array has a physical address, the method further comprising maintaining a table-map between respectively logical addresses of each dataset and the physical address in which it is stored. Thereby, moving datasets between different physical memory pages need not have any impact on program flow of any program associated with the memory, since the programme can read or write from or to the logical address, without requiring knowledge of the physical address of the memory in which the associated dataset is stored.

According to a second aspect of the present disclosure, there is provided memory system comprising: a memory array comprising a plurality of memory pages; a table-map associating logical addresses of the memory pages with physical addresses in the memory array; a stuck page list comprising a list of stuck-cell memory pages, each having a cell at a stuck-cell-identifier cell of the memory page stuck at a stuck-cell-value; and a memory controller, configured to identify a match between a first dataset and a stuck-cell memory page having a cell at a stuck-cell-identifier cell of the memory page stuck at a stuck-cell-value, and to store the dataset in the memory page.

In one or more embodiments, the cell is a single-bit cell, and the at least one bit is a single bit having a value of a one of "0" and "1". In one or more other embodiments, the cell is an n-bit cell, and the at least one bit is n bits.

In one or more embodiments, the controller is further configured to identify the stuck-cell memory page, by: writing a to-be-written dataset to the memory page; reading a check dataset from memory page; and identifying a mismatch between the to-be-written dataset and the read dataset at the stuck-cell-identifier.

In one or more particular embodiments the controller is further configured to: in response to a request to write a first dataset into the memory array, use the list to identify a match between the first dataset and a stuck-cell memory page in the stuck page list.

In one or more other particular embodiments, the controller is configured to identify a match by identifying a match from a plurality of stored datasets stored in the memory array.

The plurality of stored datasets may consist of program code.

According to one or more embodiments, the controller is further configured to move other dataset between pages of the memory array to tend to equalise a number of write operations to each memory page in the memory array.

There may be provided a computer program, which when run on a computer, causes the computer to configure any apparatus, including a circuit, controller, sensor, filter, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software implementation may be an assembly program.

The computer program may be provided on a computer readable medium, which may be a physical computer readable medium, such as a disc or a memory device, or may be embodied as another non-transient signal.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

Figure 1:
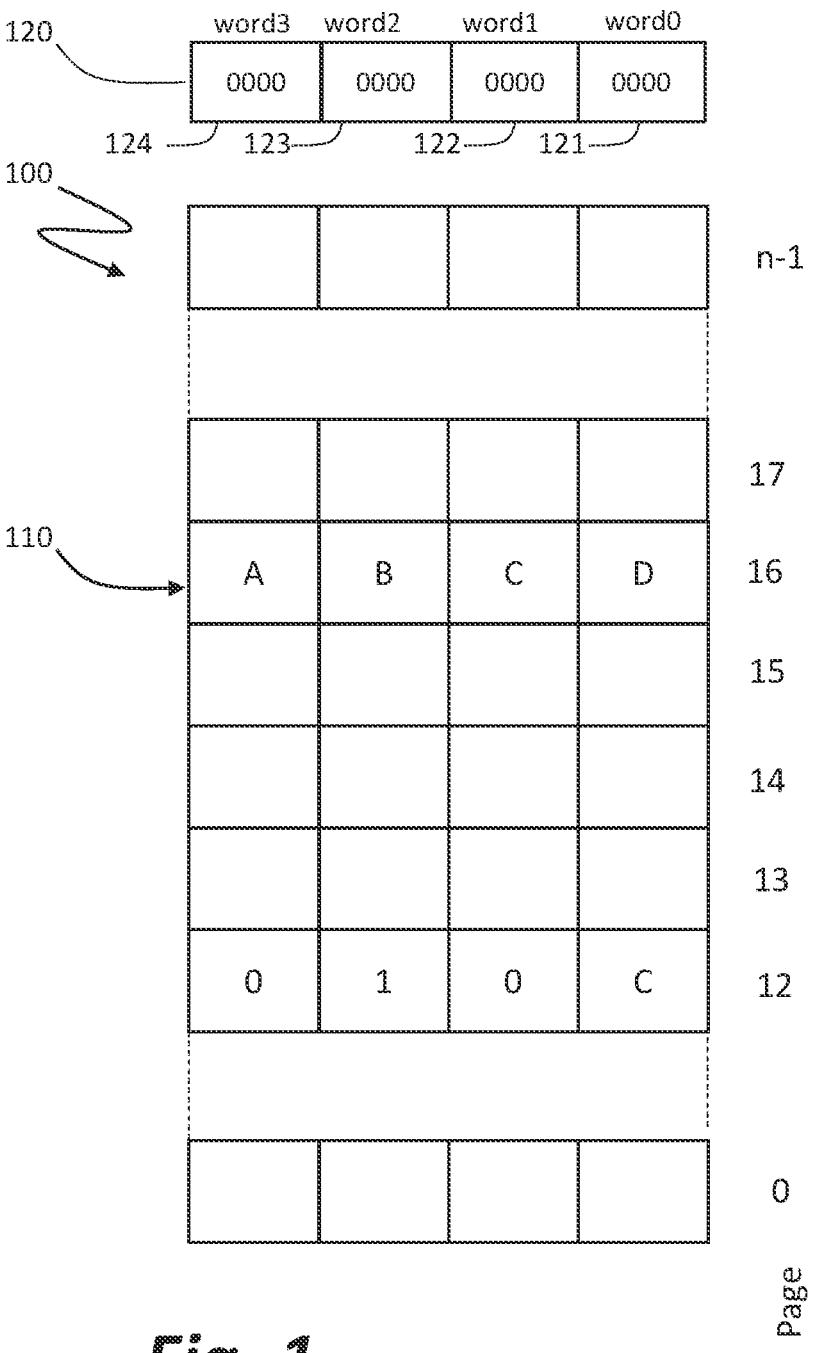
FIG. 1 illustrates an example of a memory block of memory array.

It should be noted that the figures are diagrammatic and not drawn to scale. Relative dimensions and proportions of parts of these figures have been shown exaggerated or reduced in size, for the sake of clarity and convenience in the drawings. The same reference signs are generally used to refer to corresponding or similar features in modified and different embodiments

DETAILED DESCRIPTION OF EMBODIMENTS

FIG. 1 illustrates an example of a memory block of memory array. As already mentioned such a memory array may alternatively be referred to as a memory macro. The memory macro comprises n pages, 110 (listed in the figure as page 0 . . . page 12, page 13 . . . page n–1). Each page may be further subdivided into a set of separate words, as shown at 120. In this nonlimiting example, the page is divided into four words, word0 121, word1 122, word2, 123, and word3 124; the skilled person will appreciate that the page may be divided into smaller or larger numbers of words. Furthermore, each word may contain the same fixed number of bits. In the nonlimiting example shown in FIG. 1, each word comprises four bits, although skilled person will again realise that a small or large number of bits may be included in each word. In the nonlimiting example of FIG. 1, each bit may be a binary bit taking a value of "0" or "1", although in other memory systems, each bit may be able to take more than two values—for instance "−1", "0" or "1" in the case of a ternary bit. Each page, and each word in each page, may be physically constructed of a plurality of "memory cells". A memory cell may typically be a one-bit cell—which in the case of a binary cell can store the values "0" or "1", on may be a multibit cell—for example a two-bit memory cell may include two bits and thus may for example be able to store the values "00", "01", "10", or "11". The memory cells may be termed "bitcells" or "bit cells".

Figure 2:
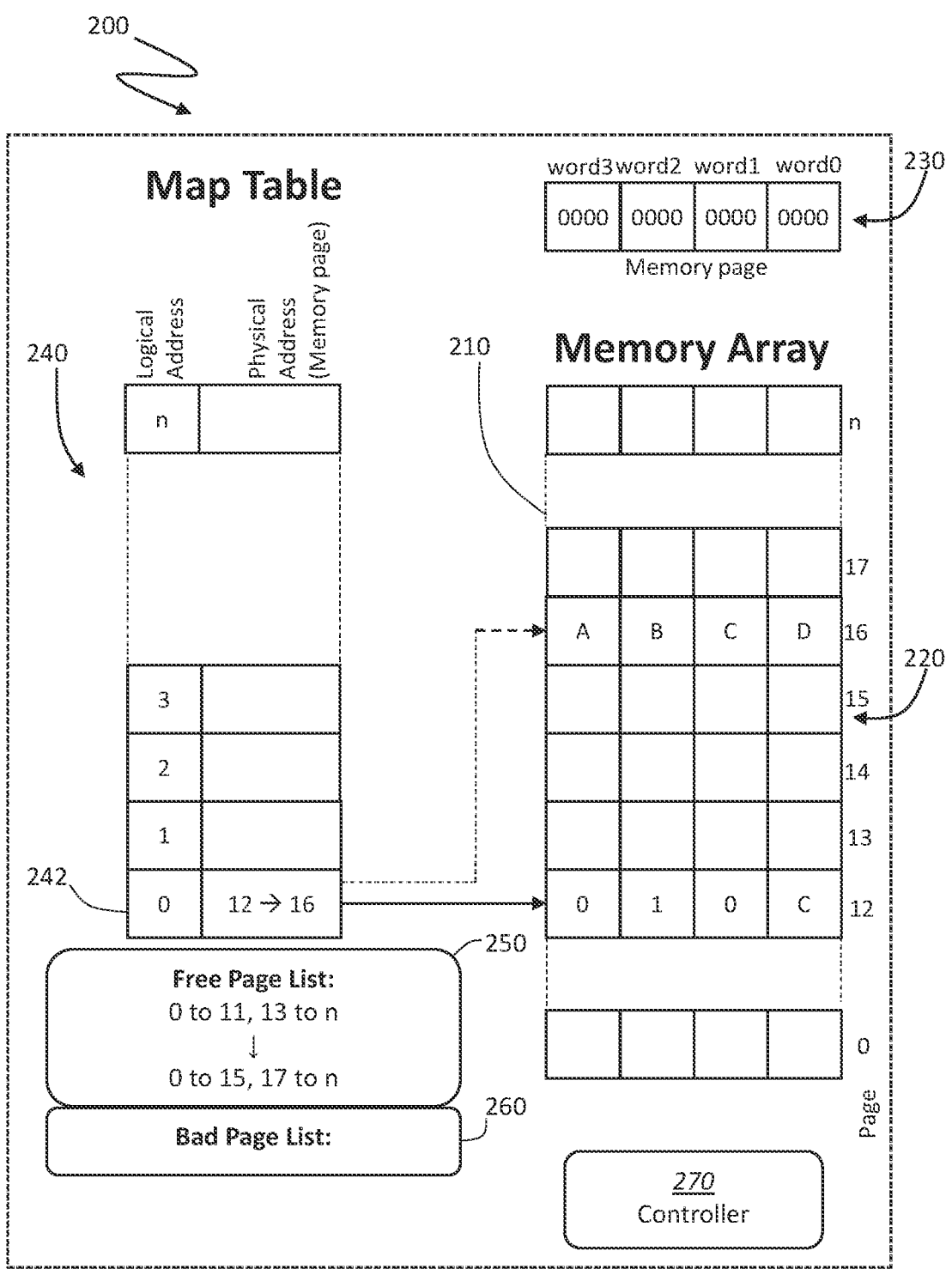
FIG. 2 illustrates a memory system including a memory array comprising n pages.

FIG. 2 illustrates a memory system 200 including a memory array 210 comprising n pages 220, each of which consists of four words; each word consisting of four bits, as illustrated at 230. As used herein, a write operation refers to writing a complete page. That is to say, for the above example in which a page comprises consists of four words each consisting of four bits, a write operation refers to writing a predetermined value onto each of 16 bits. Purely for illustration purposes, the value of each word (which in this example consists of four bits) may conveniently be written as a hexadecimal value (0, 1 . . . 9, A . . . F).

In addition to the memory array 210, the memory system includes a map table 240 which maps each logical address of the memory array to a corresponding physical address. The memory system further includes a free page list 250 and a bad page list 260. FIG. 2 illustrates a process of writing a data (having value ABCD) to logical address 0 of the memory system. At the start of the process, logical address is already mapped to physical address 12, as shown in cell 242 of the map table 240. In this example, physical address 12 (that is to say page 12) already has data stored therein, being 010C. The memory controller 270 identifies, from the free page list 250, a free page in which to write the new data (ABCD) into the memory. Although the controller may identify the first free page, that is to say the page with the lowest number, which is free, in general it will make the selection on a more sophisticated, or even random, basis in order to avoid an imbalance, over time, of use across the memory pages. In the example shown in FIG. 2, page 16 is identified as free. The data is written to page 16. The data is then read back from page 16, and upon confirmation that the right operation was successful (that is to say the data read back matches the original data to be written), the map table is updated to reflect that logical address 0 now refers to physical address 16. Physical address 16 is now removed from the free page list 250, and physical address 12 added to the free page list.

Figure 3:
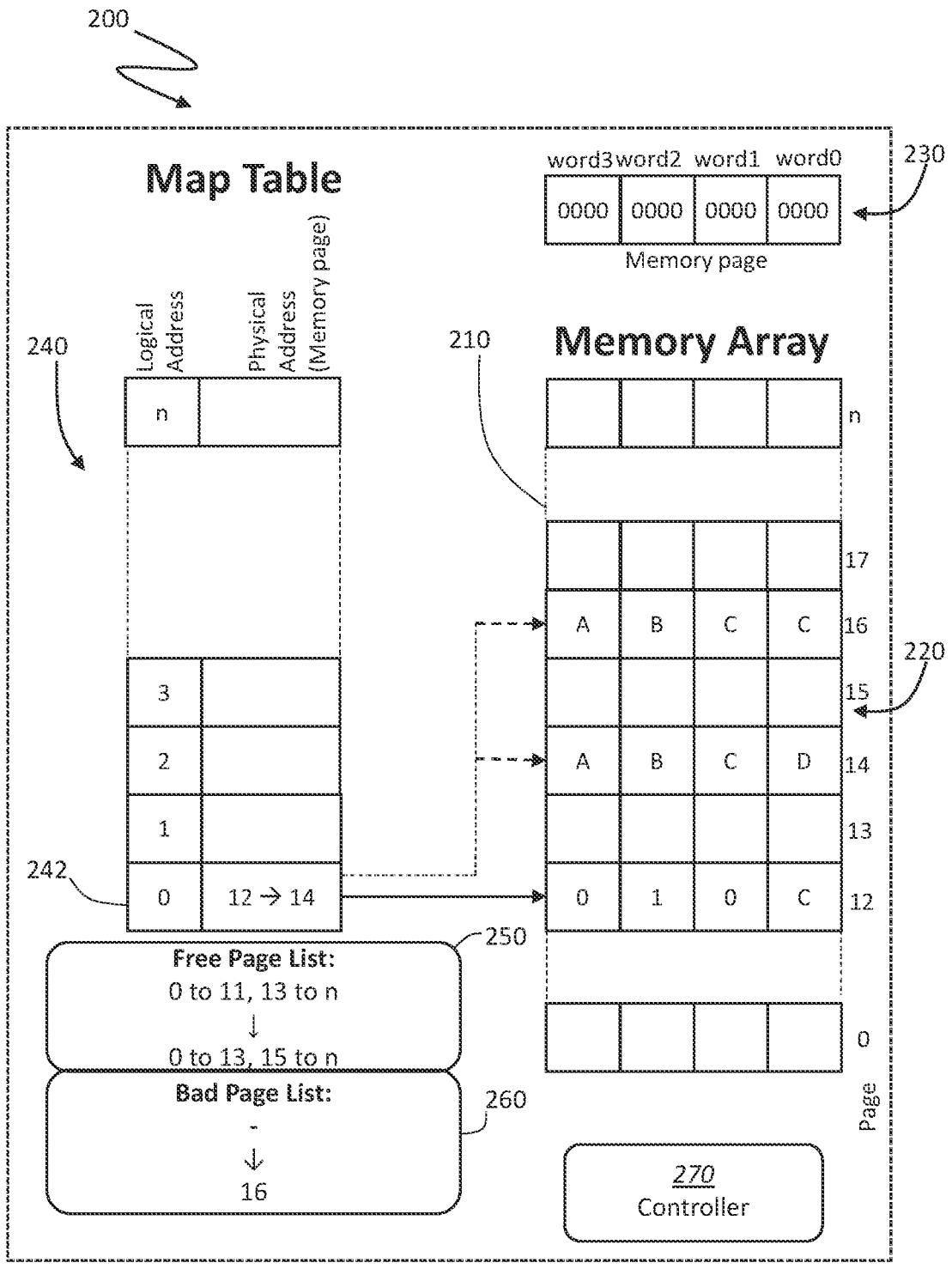
FIG. 3 illustrates a write operation to the memory in which a stuck cell is encountered.

FIG. 3 illustrates a write operation to the memory in which a stuck cell is encountered. Similar to the write operation described with respect to FIG. 2, at the start of the process, logical address is mapped to physical address 12, as shown in cell 242 of the map table 240. Physical address 12 already has data stored therein, being 010C. The memory controller identifies, from the free page list 250, a free page in which to write the new data (ABCD) into the memory. Again, page 16 is identified as a free page, and the data ABCD written onto this page. However, in the example shown here page 16 has a stuck cell whereby data bit 0 of word 0 is stuck at "0". The attempt to write "D" (i.e. 1101 in binary) into this word is unsuccessful, and what is actually stored in the memory is "C" (i.e. 1100). In consequence, when the data is read back from page 16 and compared with the original data to be written, it is identified that data bit 0 of word bit 0 is a stuck bit. As a result, the memory controller adds page 16 to the bad page list 260 and repeats the attempt to rewrite the data into another free page. That is to say the controller identifies another free page from the free page list—in this instance page 14 is identified as shown, and writes the data ABCD into this page. This time the read back operation confirms that the data has been correctly written (there being no stuck cell in page 14). Finally, the map table 240 is updated to reflect the mapping of logical address 0 to physical address 14, as shown at cell 242.

As the skilled person will appreciate, and as discussed in the introduction, over time the bad page list grows, resulting in a reduction in the capacity of the memory.

Figure 4:
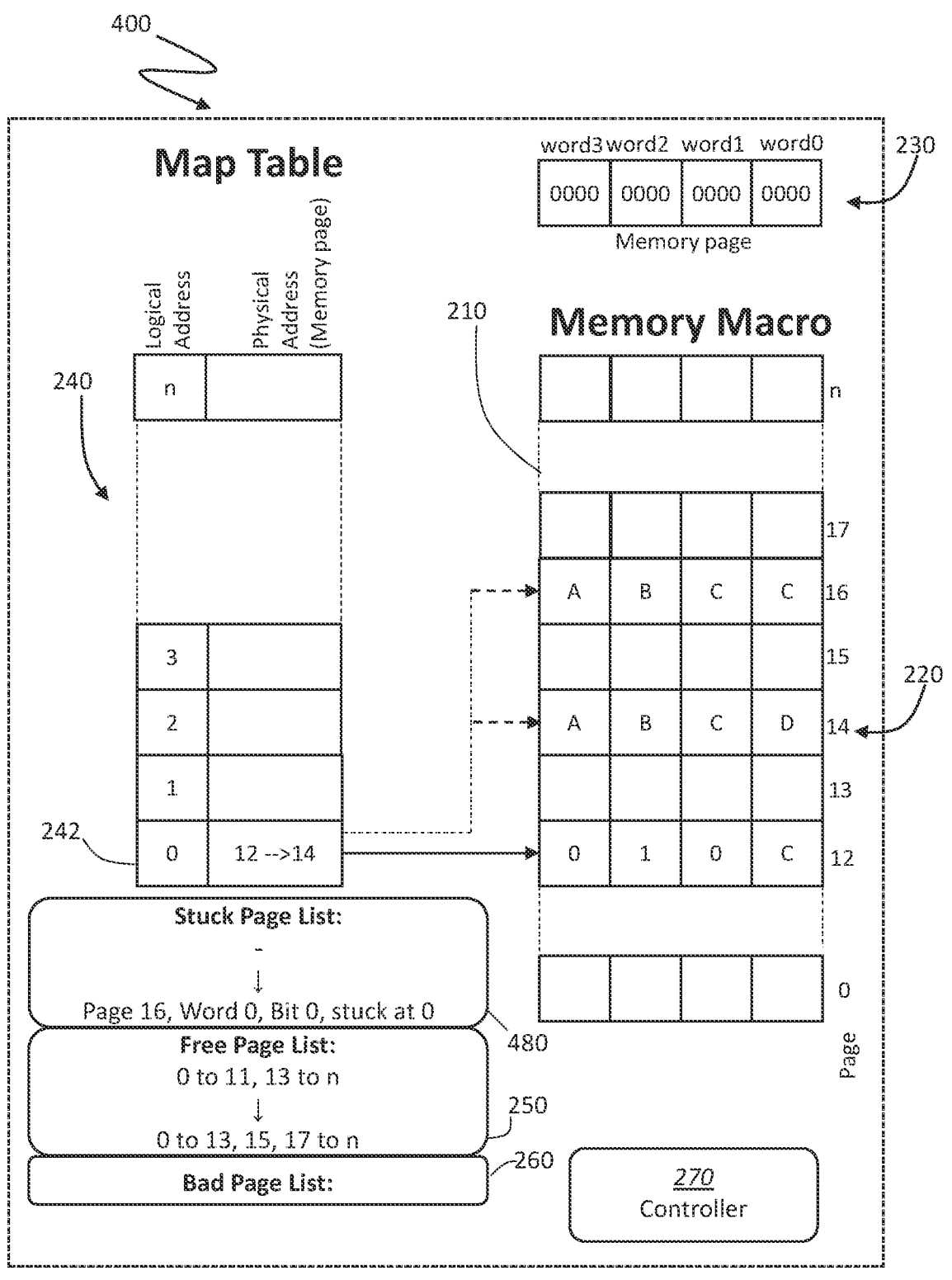
FIG. 4 illustrates a memory system and a method according to one or more embodiments of the present disclosure.

FIG. 4 shows a memory system according to the present disclosure 400 and illustrates a method according to one or more embodiments of the present disclosure. The memory system 400 differs from a conventional memory system shown in FIG. 3, in that, in addition to the free page list 250 and bad page list 260, it includes a stuck page list 480, being a list of memory pages which include at least one stuck bit, or stuck cell. The process to write data ABCD into logical address 0 proceeds as described above with reference to FIG. 3 except that, prior to identifying a suitable page to write the data in from the free page list, the memory controller 270 polls the stuck page list. In the example shown in FIG. 4, the stuck page list is initially empty, so the method continues as described above by selecting a free page from the free page list 250. Furthermore, on identification of page 16 as having a stuck bit in word 0 bit 0, instead of adding page 16 to the bad page list, the page is added to the stuck page list 480. In addition to identification of the page itself, the location of the stuck bit and the value at which the bit is stuck are stored in the stuck page list. The skilled person will appreciate that, since polling generally represents additional process steps, the memory controller may be configured to only poll the stuck page list under certain conditions, rather than on all occasions. For example, only when the bad page list has reached a certain size.

Figure 5:
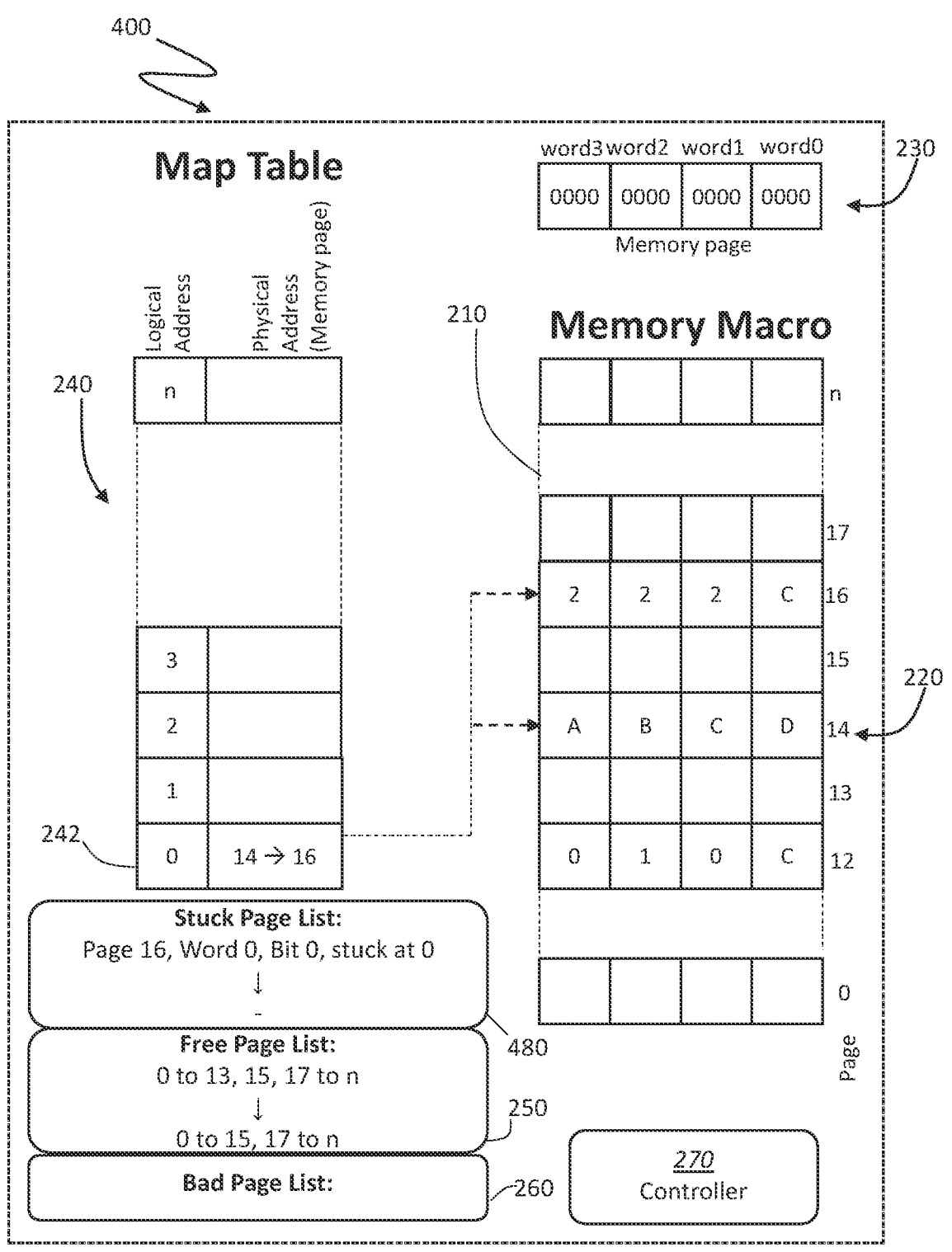
FIG. 5 shows the memory system of FIG. 4, during a subsequent write operation.

FIG. 5 shows the memory system 400, during a subsequent write operation, according to embodiments of the present disclosure. At the start of the process, the system is in a state corresponding to the end of the process described with respect to FIG. 4. In particular, logical address 0 is mapped to physical address 14 (shown at cell 242). Furthermore, the bad page list 260 is empty, and the stuck cell list at 480 identifies page 16 as having a stuck bit at word 0 bit 0 and identifies that the stuck bit is stuck at a value of "0".

In order to illustrate methods according to embodiments of the present disclosure most clearly, consider a write operation in which it is requested to write data having a value "222C" into logical address 0. In order to do so, memory controller 270 first polls the stuck page list in order to identify whether the list includes a page to which the data may be correctly written. In other words, the controller polls the stuck page list in order to identify whether the value of the stuck bit (or bits) in any of the entries in the list match the value of the corresponding bit (or bits) in the data to be written. In the example shown in FIG. 5, word 0, bit 0 in the data to be written has value "0" (since the hexadecimal value "C" can be written in binary as "1100"). Having identified a compatible page in the stuck page list, the controller then proceeds to write the data (222C in this case) into the compatible page (page 16 in this case). The data is then read back from page 16 and checked against the original data, thereby confirming that there are no other stuck bits—that is to say, to confirm that there are no newly arisen stuck bits associated with this physical address). The page to which the data has been written (page 16 in this case) is removed from the stuck page list, the mapping updated such that cell 242 indicates that a logical address 0 is associated with physical address 16, and page 14 is released for use, by adding it to the free page list.

Although, as will be apparent from the above discussion, no physical pages are added to a bad page list according to methods of the present disclosure, it may be appropriate to include a bad page list 260 in the memory system in order to separately identify other faults in the physical memory structure such as a cell which cannot be properly read. Such a bad page list could also be used as a "overflow" for the stuck page list—for example if the stuck page list were to be constrained in size and to be full. Further, a memory page could be added to such a bad page list in other situations in which the stuck page list is not appropriate. For example, in an embodiment in which the stuck page list is configured to record only one stuck bit, but a read-back operation identifies two separate bits in the page which are stuck. Or, in an embodiment in which the stuck page list is configured to record one or two stuck bits, but a read-back operation identifies more than two separate bits in the page which are stuck.

Thus, according to the aspect of the present disclosure described with reference to FIG. 5, a page having a stuck bit need not be assigned to a bad page list and taken out of use completely. Rather, a separate list of such pages may be maintained, and the pages may be used to store appropriate data, at such time as storage of that appropriate data is requested. The skilled person will appreciate that, in the case of a physical page of binary bits, having a single stuck bit, on average 50% of data write requests will include the matching value for that specific bit. The stuck page list may therefore, in general, be relatively short (since there is only 0.1% (i.e. $(\frac{1}{2})^\wedge 10$) probability that 10 consecutive datasets do not provide a match for such a newly identified stuck page. As a result of the overall overhead on the memory system required to maintain the stuck page list is relatively low.

From one perspective, the embodiment or embodiments described above with respect to FIG. 5 rely on identifying stuck-bit pages and maintaining a list of such stuck pages; whenever a new dataset is introduced to be stored in the memory the list of stuck pages is polled in order to search a match. In one or more other embodiments, the concept is inverted: that is to say, once a stuck page is identified, then one or more existing datasets already in memory are polled in order to identify a match and make use of (that is to say, store data in) the stuck-bit page (in this case by moving already-stored data into the page). Such an embodiment is shown, schematically, in FIG. 6.

Figure 6:
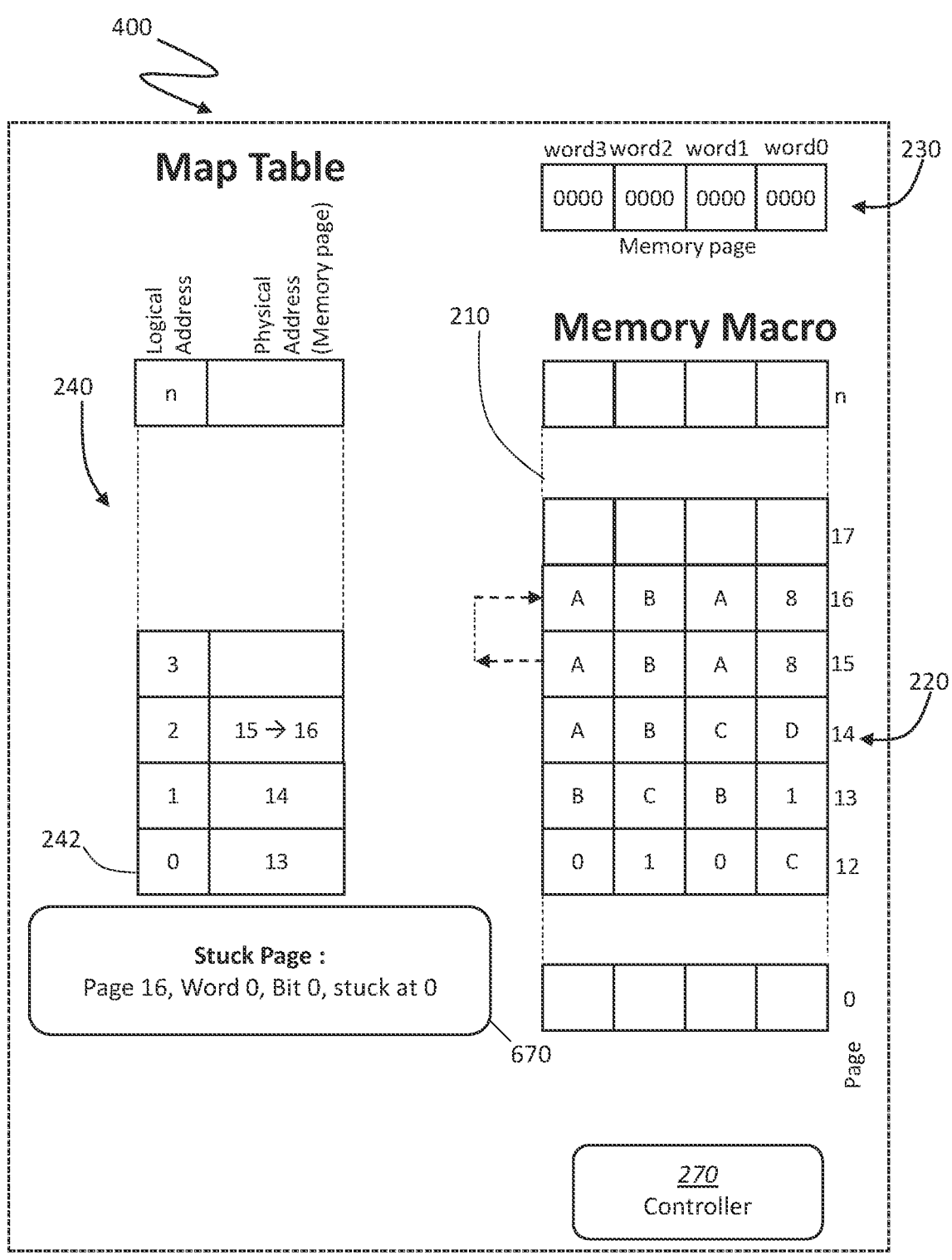
FIG. 6 illustrates a method of storing data, from the memory, in a stuck cell page according to one or more embodiments.

As illustrated in FIG. 6, in a first part of the method, a stuck page is identified (for instance by writing a dataset into the page, reading out the data and comparing the read data with the original dataset, and observing a discrepancy in one or more of the bits).

Once the stuck page has been identified and characterised, data already stored in the memory is polled, page by page, in order to identify a suitable match. Polling may be undertaken in any one of a variety of means. For example, and without limitation, each logical address may be polled in turn, starting at logical address 0 and sequentially increasing through logical address 1, 2, etc., until a suitable match is found. In the illustrated example shown in FIG. 6 the data stored in logical address 0, corresponding to physical according to the map table 240 is first polled. This dataset "BCB1" is not a match, since word0 is storing "1" in hexadecimal, which corresponds to "0001" in binary and has a "1" at word 0 bit 0. Polling thus proceed to the next address and again logical address 1, which contains "ABCD", is not a match: in the example shown and using the above-mentioned polling sequence, logical address 2, which corresponds to physical page 15, is next polled. This page contains the data "ABA8", and since the word 0 stores "8" in hexadecimal corresponding to "1000" in binary, it is a match. Having identified a match, the memory controller 270 proceeds to write the data from page 15 into the stuck bit page (page 16).

By now, the skilled person will appreciate that according to one aspect of the present disclosure, there is disclosed a method of storing data in a stuck-cell memory page of a memory array, the stuck-cell memory page having a cell at a stuck-cell-identifier cell of the memory page stuck at a stuck-cell-value, the method comprising: (a) identifying a dataset; (b) setting a logical address of the dataset; (c) identifying a stuck-cell memory page having a stuck-cell-value equal to a value of a corresponding cell of the dataset;

(d) writing the dataset to the stuck-cell memory page; and (e) mapping a physical address of the stuck-cell memory address to the logical address. However, it will also be appreciated that the above steps (a) through (e) need not be carried out in the order in which they are listed above. Of course, it will be appreciated that "having a stuck-cell-value equal to" does not imply any limitation to only a single stuck-cell, or to only a single value.

In particular, according to some embodiments, step (c), which is that of identifying a stuck-cell memory page having a stuck-cell-value equal to a value of a corresponding cell of the dataset precedes step (a), which is the step of identifying a dataset, which is later to be written to the stuck-cell memory page. Conversely, according to some other embodiments step (c), that is to say the step of identifying a stuck-cell memory page having a stuck-cell-value equal to a value of a corresponding cell of the dataset is subsequent to step (a), which is the step of identifying the dataset.

Concepts according to the present disclosure may be utilised, not only to extend the usable life of a memory array or memory macro by retaining the use of stuck-cell memory pages, but also in the context of wear levelling of a memory array. The general concept of wear levelling will be described having regard to FIG. 7; applications of embodiments of the present disclosure to enhance wear levelling will be described having regard to FIG. 8.

Figure 7:
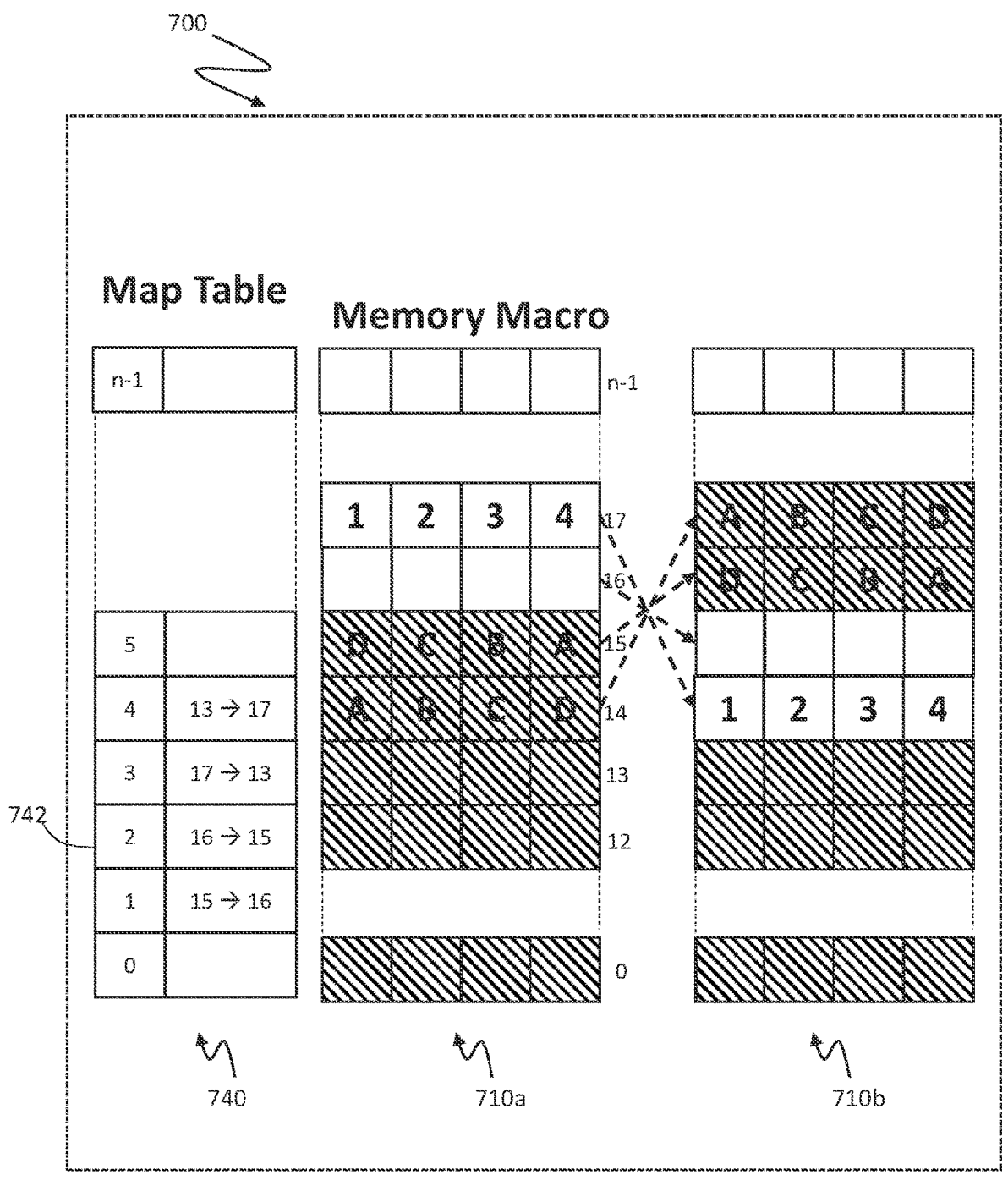
FIG. 7 shows a memory system and illustrates a method of wear levelling.

FIG. 7 shows a memory system 700 comprising a memory array or macro 710 which consists of n pages (0, 1 . . . n−1) of memory. The system also includes a map table 740 which maps the logical addresses 0, 1, . . . n−1 of the memory to the physical addresses, that is to say, pages, where the associated data is stored. In a typical memory system, two types of data (as that term is used in its generic sense) may be identified: a first type of data may be associated with "program code", such as, for instance, firmware. Typically program code, once stored in memory, is only rarely, if ever, changed and so it is rare for new values to be required to be read into the pages in which the program code is stored. The code may therefore be considered to be static or at least quasistatic. A second type of data is that of "program data". Program data may be written into the memory from external sources, read out from the memory in order to be manipulated and adapted, and rewritten into the memory, many times during the operation of a program, and thus may be escribed as dynamic. Since, typically, the program code is not altered at all during the running operation of the program it is apparent that many more read and write operations are associated with the addresses in which program data is stored than are associated with the addresses in which program code is stored. That is to say, each page and each bitcell associated with program data undergoes many more program/erase cycles than pages and bitcells associated with program code. It is well known that memory typically ages, in the sense that the number of faults that arise increases with an increased number of program/erase cycles. The concept of wear levelling attempts to improve the endurance of a memory array by periodically swapping addresses used for the static program code or firmware, and the dynamic program data.

As shown in FIG. 7, initially physical pages 1 through 15 are storing program code (illustrated by cross-hatching), and pages 16 through (n−1) used to store program data (and illustrated by no hatching). Within a wear levelling operation, the data is switched within the physical memory 710, for example including switching the contents of pages 15 and 16, and switching the contents of pages 14 and 17, as shown at 710b. For example, the dataset "ABCD" which forms part of the programme code and is stored at page 14 may be moved to page 17, whilst the dataset "1234" stored at page 17 is moved to page 14. As a result, page 17 now holds some of the program code, and may thus be considered to be static whilst page 14, holds some of the program data and thus may be considered to be dynamic. Similarly, as shown, the contents of page 15, which is part of the program code, may be swapped with the contents of page 16, which is part of the program data and currently empty. Of course, it will be appreciated that the mapping of the logical addresses to the physical addresses is also updated to ensure that the data in each logical page is unaltered.

Figure 8:
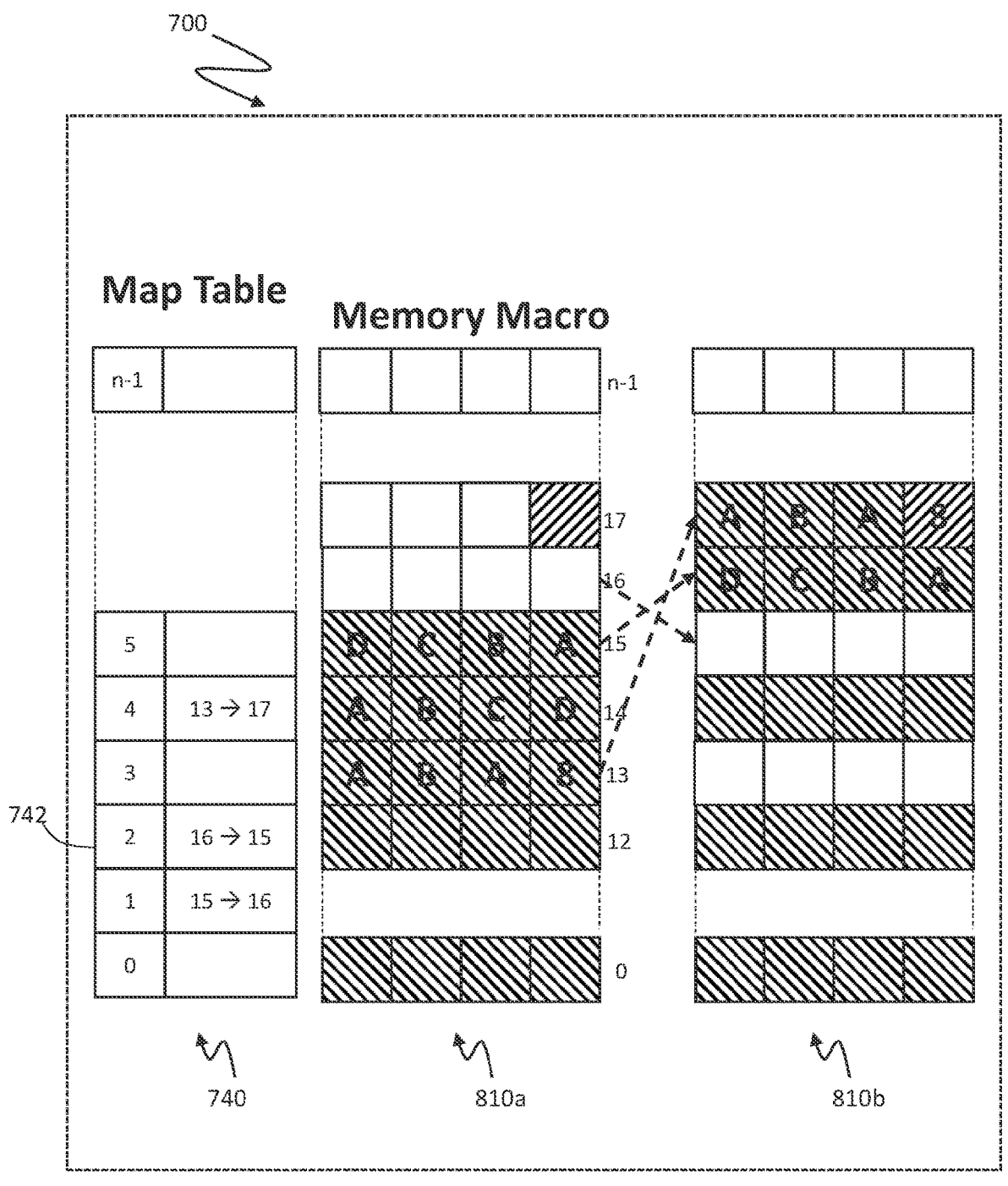
FIG. 8 illustrates a method of modifying wear levelling according to one or more embodiments.

FIG. 8 illustrates a wear levelling method according to one or more embodiments of the present disclosure. During a—failed—attempt to write data (such as "ABCD" shown in FIG. 7) into physical page 17, word 0 bit 0 of physical page 17 has been identified as a stuck bit, and thus the page identified as a stuck-bit page (and is either empty as shown or contains "ABCC" resulting from the failed write attempt) This is illustrated in the figure by reverse crosshatching of this word. In the illustrated example shown, this address is used for dynamic data storage. At least a partial wear levelling operation is then carried out, by only polling only the physical pages having program code assigned to them in order to identify a matching dataset. Once a matching dataset has been located (in this instance at physical address page 13 in which is currently stored "ABA8"), this data is transferred to the stuck-bit page (and the map table 740 updated correspondingly to ensure the logical address is correctly maintained). In most cases there would not have been data (either program code or program data) already stored in physical page 17, although in the case that there is, this data may be swapped into the page whose program code has just been swapped into the stuck cell page.

It will be appreciated that the above method described with reference to FIG. 8 may be deployed immediately once the stuck cell is identified, and thus may form an enhancement to the embodiments described above with respect to FIG. 6. Alternatively, it may be deployed in conjunction with the method and embodiments described with reference to FIG. 5, that is to say, identification of the program code page for writing into the stuck cell page need not be carried out immediately but may be carried out later, for example as part of a routine wear levelling process.

The skilled person will appreciate that in order to aid the understanding of the present invention, the term "stuck bit" has been widely used. However it should be noted that the present disclosure is not limited to a single stuck bit, but is intended to encompass scenarios in which a memory page develops a plurality of stuck bits. Furthermore, although embodiments above have been described with reference to a stuck bit, the disclosure is not limited to single bit memory cells but extends to multibit memory cells. In the case of a multi-built memory cell, the term "stuck bit" may be replaced by the term "stuck cell". In such embodiments, a stuck cell may include one or more stuck bits. For example in the case of a two bit memory cell, one or the other or both of the bits within the memory cell may be stuck at one value. For example, the first bit may be stuck at value "1) such that the memory cell may only store the values "10" and 11". As another example, the second of it may be stuck at value "1" such that the memory cell may star only the values "01" or "11". As a yet further example, the both the first and second bit of the memory cell may be stuck at the value one such that the cell may only start value "11".

In principle, the present disclosure is not limited to any specific type of memory system. As such, systems and methods disclosed herein may be used in the context of a wide range of different non-volatile memories (NVM), including but not limited to Flash, MTP, static RAM (SRAM), and non-volatile RAM (NVRAM) CBRAM, OTP. Further, the methods and systems are not constrained to any individual memory construction (and may even extend to, for instance, magnetic storage on hard disks); however they may be used to particular advantage in so-called disruptive memory systems such as resistive RAM (RRAM) and magnetic RAM (MRAM), which types of memory system are particularly susceptible to stuck-bit or stuck-cell faults. For example, in the case of RRAM, the programming mechanism may be based on the migration of ions (typically oxygen ions) into vacancies in the gate dielectric, thereby creating a conductive element. The stochastic nature of the creation and rupture of such filaments leads to variation. In the variant of RRAM known as conductive bridge RAM, the cells utilise a metal ion-based filament and can exhibit similar stochastic based behaviour. In the nonlimiting example of our RAM, stuck bits may be defined as memory bitcells that cannot be switched from a high resistive state to a low resistive state (or vice versa). The bit cells may be stuck either temporarily, or permanently.

The presence of stuck bit cells in a memory represents an overheads on the operation of the memory. It may therefore be desirable to periodically check whether a cell which has been previously identified as a stuck-cell is still stuck, or whether the cell was only temporarily stuck. In order to do so, the stuck page list 480 may be periodically checked by the memory controller. For example, the memory controller may write a test dataset which does not match the stuck cell characteristics of a page in the stuck page list into that page, and read out the dataset. A mismatch between the test dataset and the red out dataset may indicate that the cell is still stuck; conversely a match between the test dataset and the red out dataset may be indicative that the cell was only temporarily stuck, and is now operational. It will be appreciated that the memory controller may be configured to verify such an "unstuck" condition by multiple write/read operations, or other suitable processes which will be apparent to the skilled person.

Figure 9:
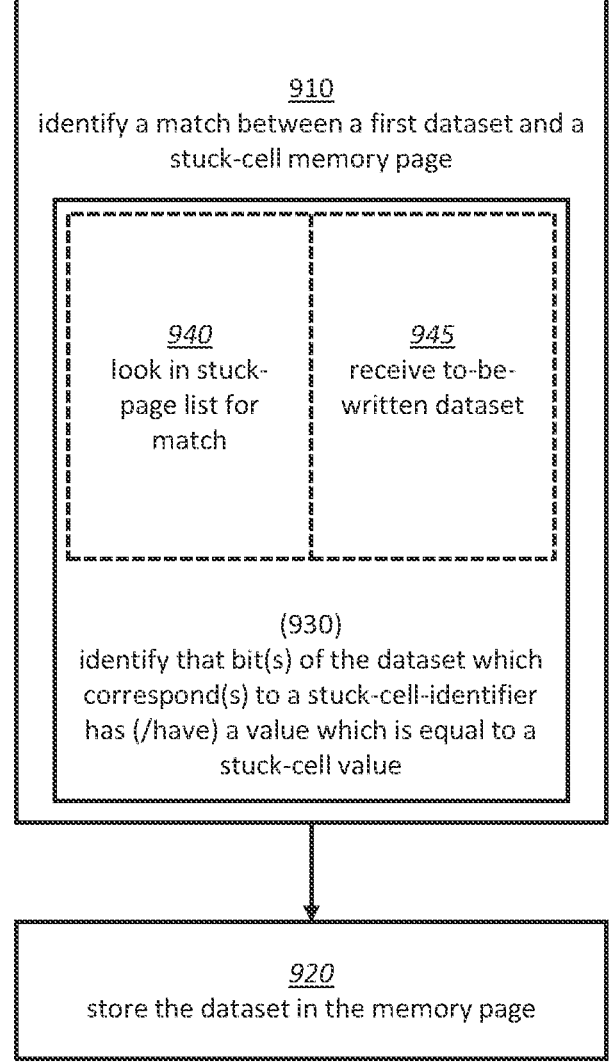
FIG. 9 shows a schematic flow diagram illustrating to one or more embodiments of the present disclosure.

As used herein, the term "dataset" refers to a plurality of data which corresponds to the size of a memory page. For example, in the nonlimiting example of a memory array wherein a memory page consists of four words, each word consisting of four binary bits of data, a dataset may be considered to have 4×4 that is to say 16 bits. Writing a dataset into a memory page thus effectively comprises overwriting each bit of the memory page with a replacement bit (it being appreciated, of course, that the replacement bit may have the same value as a bit previously in the corresponding position of the memory page. In that case, the page is updated without necessarily "overwriting" or "re-writing" the same value. That is to say, if a bit already has the desired value, it is generally not necessary to rewrite it). It will be appreciated, that as used herein, "writing" a dataset occurs generally occurs by accessing each bit (or multi-bit cell) of each word directly, FIG. 9 shows a schematic flowchart of a method according to a first group of embodiments of a first aspect of the present disclosure. The flowchart includes a first step 910 of identifying a match between a first dataset and a stuck-cell memory page. The flowchart includes a second step 920 of storing the dataset in the memory page. In more detail, the first step 910 includes the feature 930 of identifying that the bit (or bits) of the dataset which corresponds (or correspond) to the stuck-cell identifier has (or have) a value which is equal to the stuck-cell value. It will be appreciated from the above the, as used herein, the term "match" when applied to a dataset and a memory page is interpreted broadly and in particular does not refer to "being identical". However, it will also be appreciated that, in some circumstances, there could be two (or even more) stuck-bits in a memory page. In such a case, a "match" requires a correspondence between each of the stuck cells in the memory page and the correspondingly positioned bit of the dataset, rather than just any of them.

According to a first group of embodiments, identifying that the bit (or bits) of the dataset which corresponds (or correspond) to the stuck-cell identifier has (or have) a value which is equal to the stuck-cell value, includes at 945, receiving a to-be-written dataset and, at 940, looking in a stuck page list for a match for that to-be-written dataset.

Figure 10:
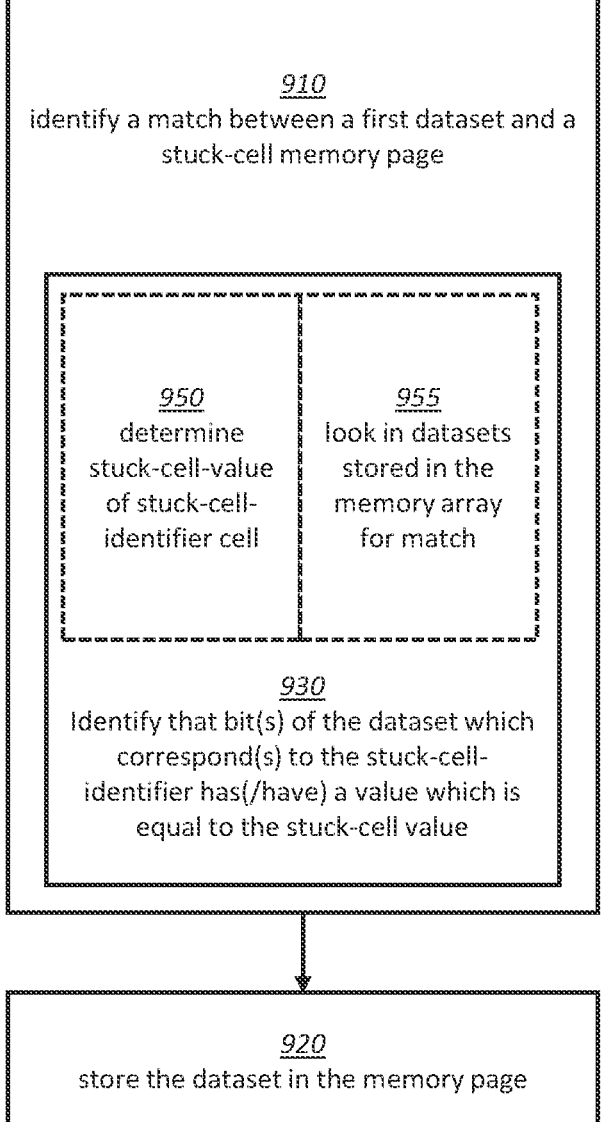
FIG. 10 shows a schematic flow diagram illustrating one or more other embodiments.

FIG. 10 shows a schematic flowchart of a method according to a second group of embodiments of the first aspect. This method is similar to that shown in FIG. 9, and thus includes the same step 910 of identifying a match between a first dataset and a stuck-cell memory page, and a step 920 of storing the dataset in the memory page; it further includes the same detail of step 910, shown at 930, of identifying that the bit (or bits) of the dataset which corresponds (or correspond) to the stuck-cell identifier has (or have) a value which is equal to the stuck-cell value. However, in this group of embodiments the detail of step 930 may include the step 950 of determining a stuck-cell-value of the stuck-cell-identifier cell in the stuck-cell memory page, and the step 955 of looking in datasets stored in the memory array for the match.

Thus, in contrast to the method according to FIG. 9, in which the starting point is the "to-be-written" dataset and the group of stuck-cell memory pages is examined in order to locate and identify a match, in FIG. 10 the starting point is the characteristics of the stuck-cell memory page, and a group of "already written" datasets is examined in order to locate and identify a match.

Figure 11:
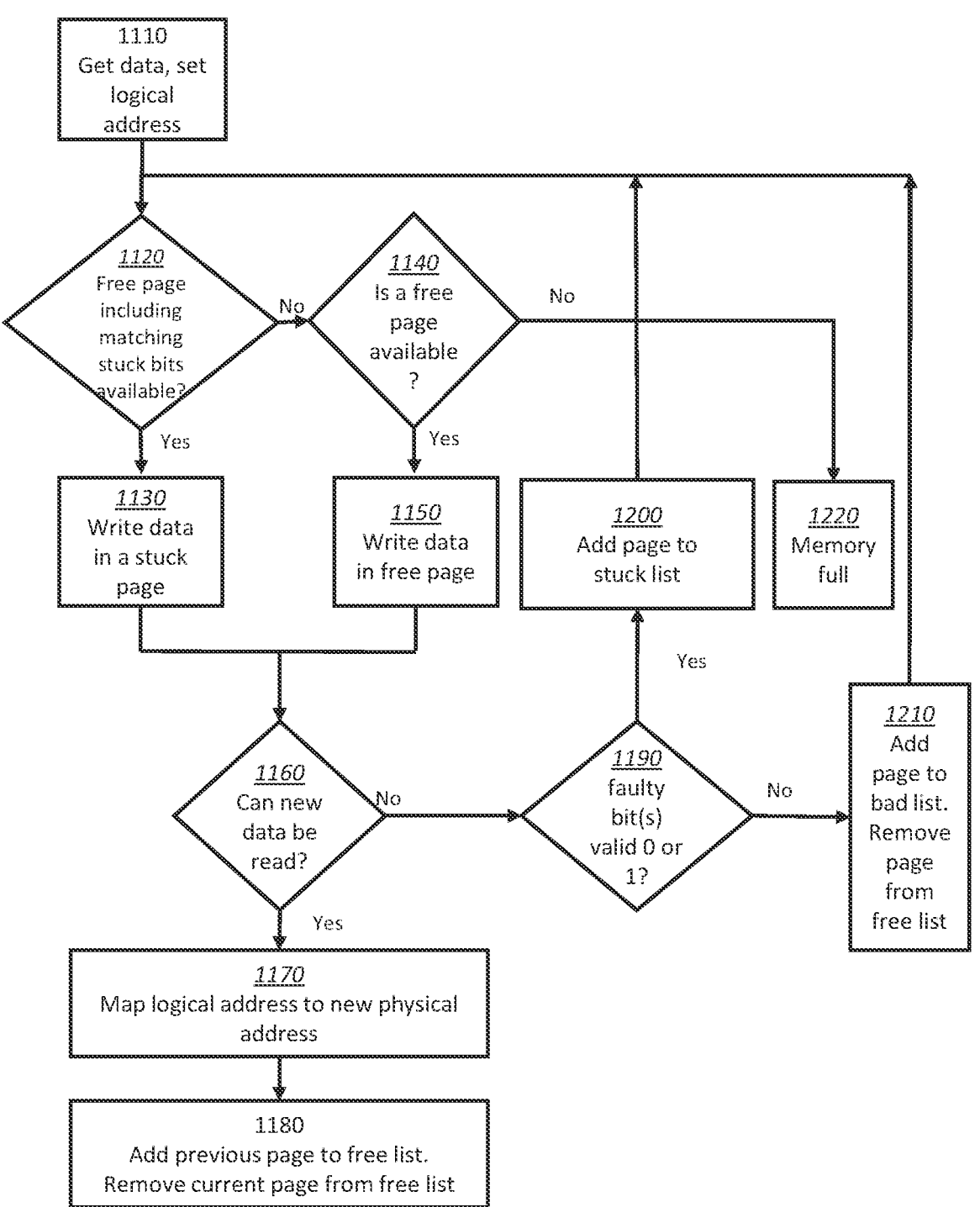
FIG. 11 shows a flowchart of a method embodying the method shown in schematic form in FIG. 9.

Turning now to FIG. 11, this shows a flowchart of a method embodying the method shown in schematic form in FIG. 9. The method includes, at 1110, receiving a dataset and setting a logical address of the dataset. The method continues at 1120 ("free page including matching stuck bits available?") by determining whether there is a stuck-data page in the stuck page list which includes stuck-cell in the appropriate stuck-cell identifier locations, which match the values of the corresponding data-bits in the received dataset. If a match is found, the method proceeds at 1130 ("write data in a stuck page") by writing that dataset to that stuck-cell memory page. If a match is not found, the method proceeds, at 1140 ("is a free page available?",) by identifying whether there is a free page available (typically by poling a free page list maintained by the memory controller). If a free page is available then the method proceeds as shown at 1150 ("write data in free page") by writing the received dataset into an identified free page.

The method then continues, as shown at 1160 ("can new data be read?") by determining whether the data newly written into the page (being either a stuck page or a free page) can be read. If, as tested at 1160, the data can be read the method proceeds as shown at 1170 ("map logical address to new physical address") by updating a map table to associate to the physical address where the data is stored with the logical address of that data. The method then proceeds, at 1180 ("add previous page to free page list. Remove current page from free list."), to update the free list page correspondingly. If, however, as tested at 1160, the new data cannot be read, the method proceeds to identify whether the 40 bit or bits have valid bit values—for example, whether they are unambiguously "1" or "0" in the case of binary data—as shown at 1190. If the faulty bits can validly be read then the page is added to the stuck page list as shown at 1200 ("add page to stuck list") and the process continues at 1120. On the other hand, if the bit or bits do not have valid bit values, the page is added to a bad page list and removed from the free page list, as shown at 1210 ("add page to bad list. Remove page from free list"), and the method continues at step 1120. According to one or more embodiments of the present disclosure, it may be assumed that a data mismatch after programming is indicative of a stuck bit, rather than being indicative of a page being bad for some other reason: typically, the programming algorithm is iterative, that is, it corresponds to: "repeat giving programming pulses until the cell is programmed", with programming failing after N unsuccessful attempts. In consequence, each cell is read N times and expected to always give the same result, so the risk of an unstable cell is minimal. However, the skilled person will be familiar with margin mode reads, which could be applied on any suspected stuck bit, to confirm that it is really a stuck bit. That is to say, to ensure that, for example, in the case of programming a "1" that what is read back as a "0" is not merely a "bad" 1, but is really a valid "0".

Finally if both a match was not found at 1120, and there is no free page available at 1140, the method concludes that the memory is full as shown at 1220 ("memory full").

Figure 12:
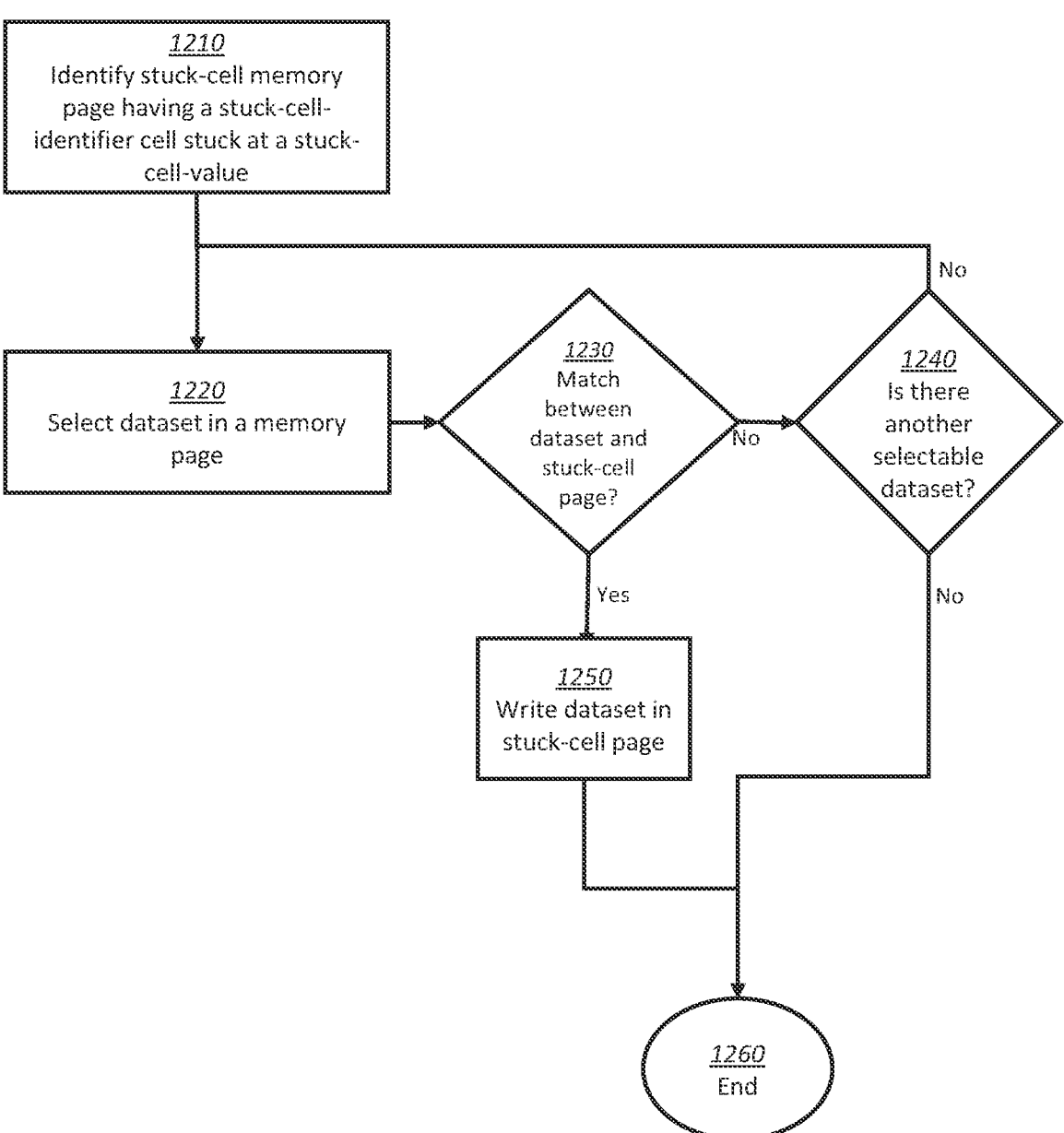
FIG. 12 shows a flowchart of a method embodying the method shown in schematic form in FIG. 10

FIG. 12 shows a flowchart of a method shown in schematic form in FIG. 10. The method starts by, at 1210, by identifying a stuck-cell memory page having a stuck-cell-identifier cell stuck at a stuck-cell-value. In the method shown in FIG. 12, the step of identifying (910) a match between a first dataset and the stuck-cell memory page is depicted by 1230 "match between dataset and stuck-cell page?" yielding a positive result. In consequence, the step of storing (920) the dataset in the stuck-cell memory page is depicted at 1250 "write dataset in stuck-cell page", and the flow can end (as shown at 1260). However, in contrast to the flow shown in FIG. 11, according to embodiments of FIG. 12, the match described at 1230 is not between a preselected dataset and a one of a range of stuck cell pages identified in a list, but rather between a preselected stuck cell page and one of a range of datasets already stored in the memory, so if there is not a match between the first selected dataset and the stuck cell page, the method continues by selecting another dataset (as shown at 1220 "select dataset in a memory page"), provided, of course, there is another stored dataset available, which is determined at step 1240 "is there are another selectable dataset?", Should the step 1240 "is there another selectable dataset?" yield a negative result, the flow naturally extends, at 1260.

From reading the present disclosure, other variations and modifications will be apparent to the skilled person. Such variations and modifications may involve equivalent and other features which are already known in the art of memory system, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims [delete if not relevant] and reference signs in the claims shall not be construed as limiting the scope of the claims. Furthermore, the word "may" is used in a permissive sense (i.e., meaning having the potential to), rather than the mandatory sense (i.e., meaning must). Similarly, the words "include," "including," and "includes" mean including, but not limited to.

The invention claimed is:

1. A method of storing data in a stuck-cell memory page of a memory array, the stuck-cell memory page having a cell at a stuck-cell-identifier cell of the memory page stuck at a stuck-cell-value, the method comprising:
  identifying a match between a first dataset and the stuck-cell memory page; and
  storing the dataset in the stuck-cell memory page;
  wherein the identifying a match comprises identifying that the at least one bit of the dataset which corresponds to the stuck-cell-identifier of the memory cell has a value which is equal to the stuck-cell value;
  wherein the step of identifying a match comprises identifying a match from a plurality of stored datasets stored in the memory array.

2. The method according to claim 1, wherein the cell is a single-bit cell, and the at least one bit is a single bit having a value of a one of "0" and "1".

3. The method according to claim 1, wherein the cell is an n-bit cell, and the at least one bit is n bits.

4. The method of claim 1 further comprising:
  identifying the stuck-cell memory page, by
  writing a to-be-written dataset to the memory page;
  reading a check dataset from the memory page; and
  identifying a mismatch between the to-be-written dataset and the read dataset at the stuck-cell-identifier.

5. The method according to claim 1 further comprising maintaining a stuck page list being a list of stuck-cell memory pages, wherein the stuck page list includes a stuck-cell-identifier and a stuck-cell value for each respective stuck-cell memory page.

6. The method of claim 5, further comprising:
  identifying the stuck-cell memory page, by
  writing a to-be-written dataset to the memory page;
  reading a check dataset from the memory page; and
  identifying a mismatch between the to-be-written dataset and the read dataset at the stuck-cell-identifier,
  in response to identifying the stuck-cell memory page, adding the stuck-cell memory page to the stuck page list.

7. The method of claim 1, wherein the plurality of stored datasets consists of program code.

8. The method of claim 1, further comprising moving other dataset between pages of the memory array to tend to equalise a number of write operations to each memory page in the memory array.

9. The method of claim 1, wherein the dataset is unaltered.

10. The method of claim 1, wherein each page of the memory array has a physical address, the method further comprising maintaining a table-map between respectively logical addresses of each dataset and the physical address in which it is stored.

11. A method of storing data in a stuck-cell memory page of a memory array, the stuck-cell memory page having a cell at a stuck-cell-identifier cell of the memory page stuck at a stuck-cell-value, the method comprising:

identifying a match between a first dataset and the stuck-cell memory page; and storing the dataset in the stuck-cell memory page;

wherein the identifying a match comprises identifying that the at least one bit of the dataset which corresponds to the stuck-cell-identifier of the memory cell has a value which is equal to the stuck-cell value;

wherein the method further comprises maintaining a stuck page list being a list of stuck-cell memory pages, wherein the stuck page list includes a stuck-cell-identifier and a stuck-cell value for each respective stuck-cell memory page;

wherein the method further comprises in response to a request to write the first dataset into the memory array, using the list to identify a match between the first dataset and a stuck-cell memory page in the stuck page list wherein the using the list includes polling the stuck page list and comparing stuck-cell pages in the list with the first dataset to determine whether a stuck-cell value of a stuck-cell page matches a value of an associated bit in the first dataset.

12. A memory system comprising:

a memory array comprising a plurality of memory pages;

a table-map associating logical addresses of the memory pages with physical addresses in the memory array;

a stuck page list comprising a list of stuck-cell memory pages, each having a cell at a stuck-cell-identifier cell of the memory page stuck at a stuck-cell-value;

and a memory controller, configured to identify a match between a first dataset and a stuck-cell memory page having a cell at a stuck-cell-identifier cell of the memory page stuck at a stuck-cell-value, and to store the dataset in the memory page;

wherein the controller is configured to identify a match by identifying a match from a plurality of stored datasets stored in the memory array.

13. The memory system according to claim 12, wherein the cell is a single-bit cell, and the at least one bit is a single bit having a value of a one of "0" and "1".

14. The memory system according to claim 12, wherein the cell is an n-bit cell, and the at least one bit is n bits.

15. The memory system according to claim 12, wherein the controller is further configured to identify the stuck-cell memory page, by:

writing a to-be-written dataset to the memory page;

reading a check dataset from memory page; and identifying a mismatch between the to-be-written dataset and the read dataset at the stuck-cell-identifier.

16. The memory system according to claim 12, wherein the controller is further configured to: in response to a request to write a first dataset into the memory array, use the list to identify a match between the first dataset and a stuck-cell memory page in the stuck page list.

17. The memory system of claim 12, wherein the plurality of stored datasets consists of program code.

18. The memory system according to claim 12, wherein the controller is further configured to move other dataset between pages of the memory array to tend to equalise a number of write operations to each memory page in the memory array.

\* \* \* \* \*